Feb. 24, 1970  H. WEBER  3,497,703
LIGHT IMPULSE COINCIDENCE DETECTING
Filed Sept. 5, 1967
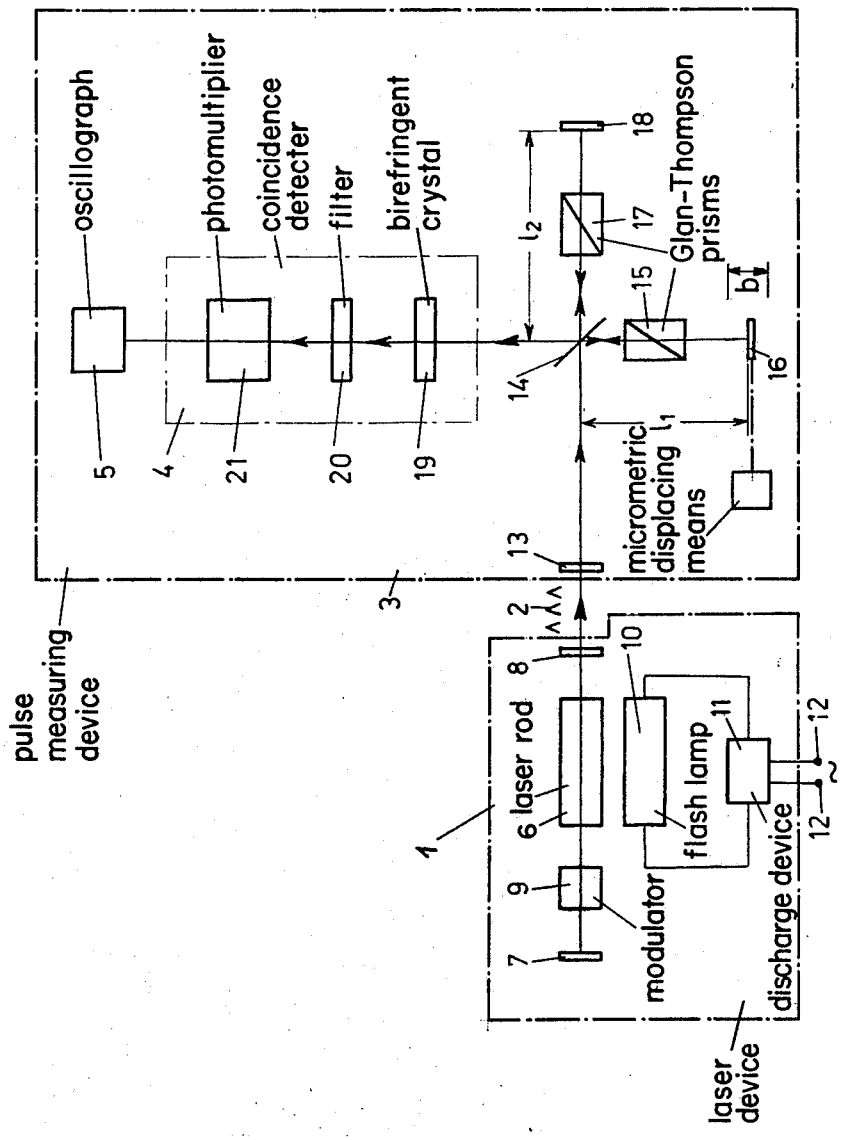

United States Patent Office 3,497,703
Patented Feb. 24, 1970

3,497,703
LIGHT IMPULSE COINCIDENCE DETECTING
Heinz Weber, Munchenbuchsee, Switzerland, assignor to Institut fur angewandt Physik der Universitat Bern, Bern, Switzerland
Filed Sept. 5, 1967, Ser. No. 665,450
Claims priority, application Switzerland, Sept. 7, 1966, 12,930/66
Int. Cl. G02f 1/18
U.S. Cl. 250—225                     7 Claims

ABSTRACT OF THE DISCLOSURE

A coincidence detector detects the coincidence of two light pulses by means of a birefringent optical non-linear crystal that generates a radiation of double the input frequency when the light pulses coincide, a filter that substantially passes only the double frequency radiation, and a photoelectric device that produces an electric signal in accordance with the intensity of the exit signal. A measuring device uses the coincidence detector and splits the signal to be measured into two orthogonally polarized output pulses which it feeds to the detector in two paths, and the length of one path relative to the other can be changed and the change measured.

---

The invention relates to coincidence detecting, and relates more particularly to a detector for establishing the coincidence of two light pulses of the same frequency.

It is among the objects of the invention to create such a detector that will function properly even when the two light pulses are of extremely short duration.

The coincidence detector according to the invention has a birefringent, optically non-linear crystal to which both optical pulses are led equiaxially but orthogonally linearly polarized, in relation to each other in such a manner that one pulse runs as ordinary radiation through the crystal. The detector furthermore has a filter following the crystal, which filter essentially transmits only rays of double frequency which occur upon coincidence of the two pulses in the crystal, and fall onto a photoelectric device which furnishes an electric signal according to said intensity of the double frequency beam.

Such a coincidence detector may be used for different purposes. Of special importance at present is its use according to the invention in a measuring arrangement for measuring the duration of very short light pulses. In such a measuring arrangement, there are produced from the input pulse, the duration of which is to be measured, two linear polarized pulses which are perpendicular in relation to each other. These two pulses are produced by means of a semi-permeable reflector and two polarizing optical means that are arranged in two different paths; these starting pulses are led to the detector coaxially in such a manner that one pulse passes through the crystal as an ordinary beam; means are provided to change the length of one path in relation to the length of the other path, and to measure this change.

Further objects and advantages of the invention will be set forth in part in the following specification and in part will be obvious therefrom without being specifically referred to, the same being realized and attained as pointed out in the claims hereof.

For a fuller understanding of the nature and objects of the invention, reference should be had to the following detailed description, taken in connection with the accompanying drawing, in which the single figure is a schematic view that shows an example of construction of the coincidence detector according to the invention in its application in a measuring arrangement to measure the duration of light pulses.

In carrying the invention into effect in one of the embodiments which has been selected for illustration in the accompanying drawing and for description in this specification, there is provided a laser arrangement 1 that transmits a series of very short light pulses 2 to a measuring device 3 with the aid of which the duration of these pulses 2 may be measured. In the measuring device 3 an input pulse 2 produces two different polarized sub-divided pulses which may be shifted in point of time by measurable amounts in relation to each other. These two sub-divided pulses are then led to a coincidence detector 4 in the measuring device 3, and there compared by means of a cathode ray oscillograph 5.

The known laser arrangement 1 comprises a rod 6 of neodymium glass which is positioned between two reflectors 7 and 8; the reflector 8 is to a considerable extent light transparent. Between the rod 6 and the reflector 7 there is mounted an amplitude modulator 9. For the excitation of the rod 6 a flash lamp 10 is used which is fed by the impulses of a condensator discharge device 11 that is connected by electrodes 12 to an electric network. The flash lamp 10, for example, is excited by the discharge device 11 about twice a minute for a duration in the order of magnitude of milliseconds. During a single discharge of this device 11, however, the laser arrangement 1 produces a whole series of light pulses 2, with intervals between successive pulses 2 measured in nanoseconds and with the duration of the individual pulses 2 in pico seconds. This result is effected by the amplitude modulator 9 which consists of a transparent vessel with a modulating liquid such as for instance a liquid obtainable under the trade designation "Eastman 9740 reversible dye." Such a modulating or bleaching liquid has the quality of being poorly transparent to light of very small intensity but fairly transparent to light of greater intensity.

In order to better understand the generation of the series of pulses 2, it should be borne in mind that upon intensification of the light rays created in the neodymium glass rod 6, an inversion occurs by depletion from the energy levels built up by the exciting light, the so-called pump light. The transparency of the modulator 9, due to such increase and decrease, repsectively, of the intensity of the rays going through it, varies, in a frequency that is a function of the distance between the reflectors 7 and 8, and thus varies respectively between good and poor transmission s'ates; and thus there are produced the series of short light pulses, in lieu of the normal longer lasting laser emission. The modulator serves thus to differentiate or sharpen the pulses 2.

For the ensuing description of the measuring arrangement 3 it does not matter in what way the light pulses, the duration of which is to be measured, were produced.

The measuring device 3 has a preferably adjustable attenuating filter 13 that serves to prevent undesired response of the measuring device 3 to the laser device 1 from backwardly reflected rays. The light pulses 2 after passing through the filter 13 are led to a beam-splitter having a transparent reflector 14 that is arranged at an angle of 45° to the optical incidence axis. The light reflected by the reflector 14 passes through a Glan-Thompson prism 15 perpendicularly onto a mirror or reflector 16 from where it is again reflected through this prism 15 onto the reflector 14, wherefrom the transmitted light proceeds to the coincidence detector 4. The original light beam that comes from the filter 13 and passes through the reflector 14 passes through a Glan-Thompson prism 17 perpendiculary onto a mirror or reflector 18 from which it is reflected back through the prism 17 onto the reflector 14, from which the reflected portion of this light beam then also passes to the coincidence detector 4, in the same axis as the light portion coming from the reflector 16. Thereby from every original incident or input pulse 2 there are thus produced two output pulses by means of the beam-splitter 14. These two output pulses are then guided into the same output axis on which that coincide in time only when the distances $l_1$ and $l_2$ between the beam-splitting reflector 14 and the reflectors 16 and 18, respectively, are equal.

The Glan-Thompson prisms 15 and 17 are arranged in such a manner that both output pulses are linearly polarized in planes that are perpendicular relative to each other. At least one of the reflectors 16 and 18, for example the reflector 16, is displaceable relative to the beam-splitting reflector 14 in a region $b$, where the amount of displacement is measurable micrometrically.

The coincidence detector 4 comprises a birefringent crystal 19 that may be composed of potassium-dihydrogen-phosphate, in short called KDP-crystal; the crystal 19 is followed by a green filter 20 and a photo-electron-multiplier 21, the output signal of which is led to the cathode beam oscillograph 5. As considerable testing has shown, the KDP-crystal has the non-linear quality that when its optical axis is disposed at a certain angle, namely an angle of 59° 49'., relative to the common incidence direction of two simultaneously incoming beams, perpendicularly polarized in relation to one another, of which one beam passes through the crystal as an ordinary beam, the KDP-crystal provides an output beam that contains light of double the frequency of the input beam. As the laser device 1 with the neodymium glass rod 6 produces a light beam with a wavelength of 10,600 A., the output light beam from the KDP-crystal 19 contains a light beam portion of double frequency, with a wavelength of 5,300 A., and only this light beam portion passes through the green filter 20.

The photo-electron multiplier 21 is excited only when both output pulses coincide at least partially. At exact coincidence of both output pulses, the output signal of the detector 4 has its greatest value, as can be detected with the cathode ray oscillograph 5.

The exact coincidence may be brought about by micrometric shifting of the reflector 16; if one shifts the reflector 16 starting from the coincidence position by a micrometrically measurable distance $\Delta 1$ until the signal of the detector 4 disappears, one can compute the duration $t$ of the pulses 2 from the relation $$t = \frac{2\Delta 1}{c}$$

in which $c$ is the speed of light. It is self-evident that the pulse duration thus determined is merely a sort of average value which does not consider the special form of the pulse. This arrangement, on the other hand, permits for the first time the determination of light pulses in the range of pico seconds.

The above described coincidence detector 4 may also be used for other purposes than for measuring the duration of light pulses. It is for instance possible that such a coincidence detector 4 may be important in the development of computers which do not operate on electric pulses but on light pulses. Furthermore, the detector 4 in the arrangement 3 may also be used for measuring a distance, for which the reflector 16, or 18, may be shifted as calculated from the reflector 14. This shifting is not measured micrometrically but by counting the quantity of maxima which is indicated by the oscillograph 5 when the reflector 16 or 18 is shifted. Instead of the KDP-crystal, a crystal of ammonium-dihydrogen-phosphate may for instance be used.

I wish it to be understood that I do not desire to be limited to the exact details of construction shown and described, for obvious modifications will occur to a person skilled in the art.

I claim:

1. A coincidence detector, for use in detecting the coincidence of two light pulses led equi-axially and linearly orthogonally polarized and of the same frequency in an optical path, comprising crystal means, having birefringent optically non-linear characteristics, disposed in said optical path to receive both said pulses and aligned relative to said optical path to receive one of said pulses as an ordinary beam, said characteristics of said crystal means serving to establish an output pulse of double frequency upon the coincidence of both pulses in the crystal means;

a filter following said crystal means receiving from said crystal means, and transmitting said output pulse of double frequency;

and a photoelectric device receiving the pulse transmitted by said filter.

2. A detector according to claim 1, characterized in that said crystal is a potassium-dihydrogen-phosphate crystal.

3. A detector according to claim 1, characterized in that the optical axis of the crystal forms an angle of 59°49' with the incidence axis of the pulses.

4. A detector according to claim 1, characterized in that said filter is a green filter.

5. A detector according to claim 1, characterized in that said crystal is an ammonium-dihydrogen-phosphate crystal.

6. A measuring device, for use in measuring the duration of a very short light pulse, said device comprising a semi-transparent reflector operable for receiving said short light pulse as an input pulse and splitting said pulse into two output pulses and directing said output pulses into two separate optical paths, polarizing means disposed in each of said separate optical paths for linearly and orthogonally polarizing said output pulses;

a coincidence detector including crystal means having birefringent optically non-linear characteristics;

means guiding said polarized output pulses from said separate optical paths equi-axially into a common optical path, said crystal means being disposed in said common optical path to receive both pulses and so aligned to receive one pulse as an ordinary beam, said crystal means serving to establish an output pulse of double frequency upon the coincidence of both pulses in the crystal means;

and means for changing the length of one of said separate paths relative to the other separate path, and to measure said change in length.

7. A measuring device, as claimed in claim 6, said means guiding said output pulses comprising a mirror, and said polarizing means comprising a Glan-Thompson prism positioned in each optical path, the length of each said optical path being the distance between said semi-transparent reflector and said mirror, whereby each of said output pulses, one reflected by said semi-transparent reflector and the other respectively transmitted by the same is led through a Glan-Thompson prism to a related mirror and is thereby reflected back through the respective prism to said semi-transparent reflector.

References Cited

UNITED STATES PATENTS

| | | |
|---|---|---|
| 2,848,921 | 8/1958 | Koulikovitch. |
| 2,998,746 | 9/1961 | Gievers _____ 250—225 |
| 3,302,027 | 1/1967 | Fried et al. _____ 250—199 |
| 3,353,896 | 11/1967 | Blattner _____ 350—150 X |

JAMES W. LAWRENCE, Primary Examiner

D. O'REILLY, Assistant Examiner

U.S. Cl. X.R.

356—106